United States Patent
Schaaf et al.

(10) Patent No.: US 11,321,756 B1
(45) Date of Patent: May 3, 2022

(54) VOICE-ASSISTED SCANNING

(71) Applicant: Amazon Technologies, Inc., Seattle, WA (US)

(72) Inventors: Thomas Schaaf, Pittsburgh, PA (US); Stan Weidner Salvador, Tega Cay, SC (US)

(73) Assignee: Amazon Technologies, Inc., Reno, NV (US)

( * ) Notice: Subject to any disclaimer, the term of this patent is extended or adjusted under 35 U.S.C. 154(b) by 409 days.

(21) Appl. No.: 15/707,816

(22) Filed: Sep. 18, 2017

Related U.S. Application Data

(63) Continuation of application No. 14/074,346, filed on Nov. 7, 2013, now Pat. No. 9,767,501.

(51) Int. Cl.
*G06Q 30/06* (2012.01)
*G06F 40/00* (2020.01)

(52) U.S. Cl.
CPC ......... *G06Q 30/0623* (2013.01); *G06F 40/00* (2020.01)

(58) Field of Classification Search
CPC ........ G06Q 30/06; G06Q 30/00; G06Q 20/20; G06Q 20/32; G06Q 20/322; G06Q 20/202; G06Q 30/0623; G06F 3/16; G06K 7/10; H04N 1/107
USPC .............. 455/461; 235/385, 462.45; 705/16; 715/728
See application file for complete search history.

(56) References Cited

U.S. PATENT DOCUMENTS

| | | | | |
|---|---|---|---|---|
| 5,698,834 | A * | 12/1997 | Worthington | G06K 7/10881 235/462.45 |
| 8,447,144 | B2 * | 5/2013 | King | H04N 1/00244 382/313 |
| 9,143,638 | B2 * | 9/2015 | King | H04N 1/00334 |
| 9,202,247 | B2 * | 12/2015 | Pettyjohn | G10L 15/26 |
| 9,330,659 | B2 | 5/2016 | Ju et al. | |
| 9,472,185 | B1 | 10/2016 | Yeracaris et al. | |
| 9,484,021 | B1 | 11/2016 | Mairesse et al. | |
| 9,595,029 | B1 * | 3/2017 | Catoe | G06Q 20/18 |
| 9,767,501 | B1 * | 9/2017 | Schaaf | G06Q 30/0623 |
| 10,089,614 | B1 * | 10/2018 | Catoe | G07G 1/01 |

(Continued)

OTHER PUBLICATIONS

Office action for U.S. Appl. No. 14/074,346, dated Oct. 21, 2016, Schaaf et al., "Voice-Assisted Scanning", 15 pages.

(Continued)

*Primary Examiner* — Peter Ludwig
*Assistant Examiner* — Avia Salman
(74) *Attorney, Agent, or Firm* — Lee & Hayes, P.C.

(57) ABSTRACT

In some cases, a handheld device that includes a microphone and a scanner may be used for voice-assisted scanning. For example, a user may provide a voice input via the microphone and may activate the scanner to scan an item identifier (e.g., a barcode). The handheld device may communicate voice data and item identifier information to a remote system for voice-assisted scanning. The remote system may perform automatic speech recognition (ASR) operations on the voice data and may perform item identification operations based on the scanned identifier. Natural language understanding (NLU) processing may be improved by combining ASR information with item information obtained based on the scanned identifier. An action may be executed based on the likely user intent.

20 Claims, 9 Drawing Sheets

(56) References Cited

U.S. PATENT DOCUMENTS

| | | | |
|---|---|---|---|
| 2002/0138273 A1* | 9/2002 | Raman | G06K 19/06028 704/270 |
| 2002/0158133 A1* | 10/2002 | Conzola | G07G 1/00 235/462.45 |
| 2003/0158796 A1 | 8/2003 | Balent | |
| 2004/0107136 A1 | 6/2004 | Nemirofsky et al. | |
| 2004/0210442 A1* | 10/2004 | Glynn | G06Q 10/06 704/275 |
| 2004/0238637 A1 | 12/2004 | Russell et al. | |
| 2005/0015301 A1 | 1/2005 | Johnson | |
| 2005/0131695 A1 | 6/2005 | Lucente et al. | |
| 2005/0136949 A1* | 6/2005 | Barnes, Jr. | G06Q 10/1053 455/461 |
| 2005/0200632 A1 | 9/2005 | Davis | |
| 2005/0242180 A1* | 11/2005 | Byford | G06Q 30/0603 235/385 |
| 2006/0020486 A1 | 1/2006 | Kurzweil et al. | |
| 2006/0029296 A1* | 2/2006 | King | H04N 1/00244 382/313 |
| 2006/0038009 A1 | 2/2006 | Russell et al. | |
| 2006/0085293 A1 | 4/2006 | Melucci | |
| 2006/0119900 A1* | 6/2006 | King | H04N 1/00244 358/462 |
| 2006/0167790 A1 | 7/2006 | Gould et al. | |
| 2007/0017998 A1* | 1/2007 | Sears | G06K 7/10881 235/462.45 |
| 2007/0080930 A1 | 4/2007 | Logan et al. | |
| 2007/0198267 A1* | 8/2007 | Jones | G06F 16/332 704/257 |
| 2008/0237339 A1* | 10/2008 | Stawar | B62B 3/1408 235/383 |
| 2008/0238009 A1* | 10/2008 | Carpenter | B62B 3/1408 280/33.992 |
| 2008/0243626 A1* | 10/2008 | Stawar | B62B 3/1424 705/23 |
| 2008/0290987 A1* | 11/2008 | Li | G06Q 30/02 340/5.1 |
| 2009/0030689 A1* | 1/2009 | Perrin | G10L 15/065 704/246 |
| 2009/0157487 A1 | 6/2009 | Cottrell et al. | |
| 2010/0082674 A1 | 4/2010 | Yiu et al. | |
| 2010/0161345 A1 | 6/2010 | Cain et al. | |
| 2010/0183246 A1* | 7/2010 | King | H04N 1/00244 382/305 |
| 2011/0123004 A1* | 5/2011 | Chang | G06F 16/433 379/88.01 |
| 2011/0153614 A1 | 6/2011 | Solomon | |
| 2012/0019399 A1 | 1/2012 | Vargo et al. | |
| 2012/0089470 A1* | 4/2012 | Barnes, Jr. | G06Q 10/1053 705/16 |
| 2012/0173351 A1 | 7/2012 | Hanson et al. | |
| 2012/0232897 A1 | 9/2012 | Pettyjohn et al. | |
| 2013/0080289 A1 | 3/2013 | Roy et al. | |
| 2013/0110666 A1* | 5/2013 | Aubrey | G06Q 30/0269 705/26.5 |
| 2013/0124362 A1* | 5/2013 | Katcher | G06Q 30/0633 705/26.8 |
| 2013/0138656 A1* | 5/2013 | Wheaton | G06Q 10/08 707/740 |
| 2013/0166419 A1* | 6/2013 | Rothschild | G06Q 30/06 705/27.1 |
| 2013/0173466 A1* | 7/2013 | Lepisto | G06Q 30/02 705/44 |
| 2014/0120981 A1* | 5/2014 | King | H04N 1/00334 455/556.1 |
| 2014/0168716 A1* | 6/2014 | King | G06F 16/5846 358/473 |
| 2014/0244429 A1* | 8/2014 | Clayton | G06Q 30/0631 705/26.7 |
| 2014/0279241 A1 | 9/2014 | Bartholomew et al. | |
| 2014/0330659 A1* | 11/2014 | Yopp | G06Q 20/202 705/21 |
| 2015/0052115 A1* | 2/2015 | Sharifi | G06Q 30/0631 707/722 |
| 2015/0081550 A1* | 3/2015 | Priebatsch | G06Q 20/40145 705/44 |
| 2015/0170641 A1 | 6/2015 | Kennewick et al. | |
| 2015/0234636 A1* | 8/2015 | Barnes, Jr. | G06Q 10/1053 715/728 |
| 2015/0242933 A1 | 8/2015 | Beguin et al. | |
| 2015/0269176 A1 | 9/2015 | Marantz et al. | |
| 2016/0005196 A1 | 1/2016 | Awadallah et al. | |
| 2016/0188706 A1* | 6/2016 | Momosaki | G06F 16/951 707/722 |
| 2017/0092264 A1 | 3/2017 | Hakkani-Tur et al. | |

OTHER PUBLICATIONS

Office action for U.S. Appl. No. 14/074,346, dated Apr. 11, 2016, Schaaf et al., "Voice-Assisted Scanning", 14 pages.

* cited by examiner

800 ↘

```
┌─────────────────────────────────────────────────────────────┐
│ RECEIVE, AT A HANDHELD DEVICE THAT INCLUDES A MICROPHONE AND│
│           A SCANNER, A VOICE INPUT FROM A USER              │
│                             802                             │
└─────────────────────────────────────────────────────────────┘
                              │
                              ▼
┌─────────────────────────────────────────────────────────────┐
│ RECEIVE A SCANNER ACTIVATION INPUT FROM THE USER TO ACTIVATE│
│ THE SCANNER TO SCAN AN IDENTIFIER (E.G., A BARCODE) OF AN   │
│                            ITEM                             │
│                             804                             │
└─────────────────────────────────────────────────────────────┘
                              │
                              ▼
┌─────────────────────────────────────────────────────────────┐
│ COMMUNICATE VOICE DATA ASSOCIATED WITH THE VOICE INPUT AND  │
│ IDENTIFIER INFORMATION ASSOCIATED WITH THE SCANNED IDENTIFIER│
│   TO A REMOTE SYSTEM FOR VOICE-ASSISTED SCANNING            │
│                             806                             │
└─────────────────────────────────────────────────────────────┘
```

FIG. 8

VOICE-ASSISTED SCANNING

CROSS-REFERENCE TO RELATED APPLICATIONS

This application is a continuation of, and claims priority to, co-pending, commonly-owned U.S. patent application Ser. No. 14/074,346, entitled "VOICE-ASSISTED SCANNING", filed on Nov. 7, 2013, which application is incorporated herein in its entirety by reference.

BACKGROUND

Some devices may allow a user to provide voice input to identify a particular product of interest. Further, some devices may allow a user to scan a barcode or other visual identifier of a product. However, there are limitations associated with both voice input systems and barcode scanning systems. For example, some items may be difficult to describe precisely by voice, and barcode scanners may present difficulties in certain situations (e.g., when product packaging including the barcode is not available).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an example process for combining voice data and scanned identifier information received at a handheld device for voice-assisted scanning, according to some implementations.

DETAILED DESCRIPTION

In some applications (e.g., a grocery delivery service), a user may desire to add a particular number of items to a list (e.g., a virtual shopping cart), identify similar items, or request additional information with respect to a particular item, among other alternatives. A scanner may allow a user to add a particular item to a list by scanning a barcode (or quick response (QR) code, radio-frequency identification (RFID), near-field communication (NFC) identifier, or other identifier) on a product package. In some cases, a voice interface may allow a user to identify and add the particular item to a list. However, some items may be difficult to describe precisely by voice, and scanners can be awkward if multiple units of a particular item are desired or if the user desires to add a similar item that is not the exact item being scanned (e.g., a different size, flavor, brand, etc.).

This disclosure includes, in part, techniques and arrangements for voice-assisted scanning that combines information associated with a scanned identifier (e.g., a barcode) with voice input from a user to improve voice recognition. In some cases, a handheld electronic device that includes a microphone and a scanner may be used for voice-assisted scanning. For example, a user may provide a voice input via the microphone and may activate the scanner to scan an item identifier (e.g., a barcode). The handheld device may communicate voice data and item identifier information to a remote system for voice-assisted scanning. The remote system may perform automatic speech recognition (ASR) operations on the voice data and may perform item identification operations based on the scanned identifier. Natural language understanding (NLU) processing may be improved by combining ASR information with item information obtained based on the scanned identifier. The system may execute an action (e.g., adding an item to a virtual shopping cart of the user or providing product information to the user) based on the likely user intent.

Example Frameworks

Figure 1:
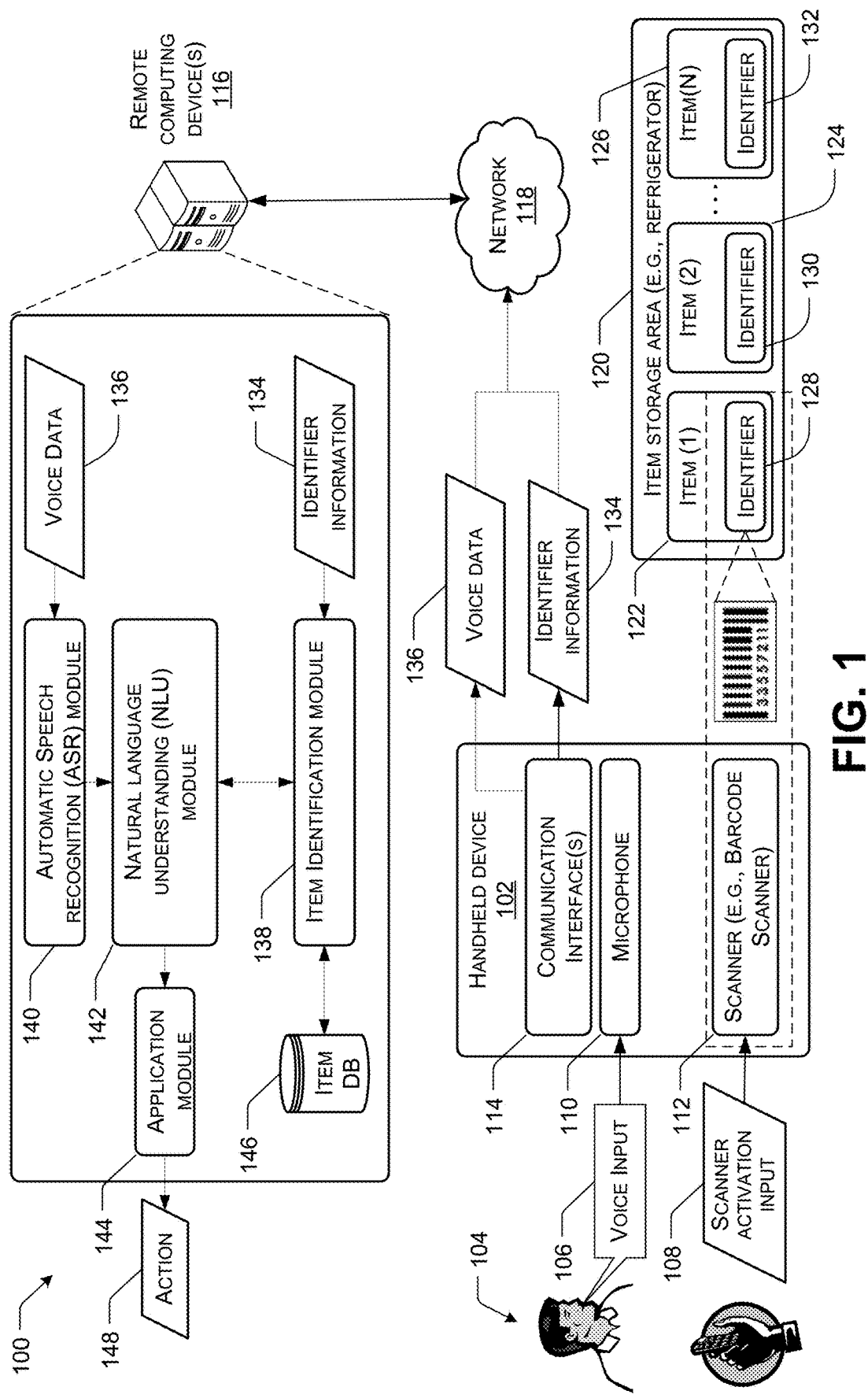
FIGS. 1-4 illustrate example frameworks for voice-assisted scanning that combines voice input from a user and a scanned physical identifier (e.g., a barcode), according to some implementations.

FIG. 1 illustrates an example framework 100 for voice-assisted scanning that combines voice information and scanned product identifier information (e.g., barcode information), according to some implementations. FIG. 1 shows illustrative interactions between a handheld device 102, a user 104, and a remote system when performing voice-assisted scanning operations. The handheld device 102 allows the user 104 to both scan an item and provide supplemental voice information to be associated with the scanned item for improved voice recognition and an enhanced user experience.

The handheld device 102 is configured to receive a voice input 106 and a scanner activation input 108 from the user 104. While not shown in FIG. 1, the scanner activation input 108 may include actuation of a physical button, trigger, or switch of the handheld device 102. Alternatively, in some cases, the scanner activation input 108 may include a selection of a virtual control on a touchscreen of the handheld device 102, or a verbal command from the user 104, among other alternatives. The handheld device 102 includes a microphone 110 (or other audio input component) configured to receive the voice input 106 from the user 104 and further includes a scanner 112 (e.g., a barcode scanner or other optical component such as a camera) to scan an item identifier (e.g., a barcode on a product package). The scanner 112 may be activated in response to the scanner activation input 108 received from the user 104 (e.g., while the user 104 is pointing the handheld device 102 towards a particular item to be identified). The handheld device 102 further includes one or more communication interfaces 114 to communicate with one or more remote computing devices 116 via at least one communication network 118.

FIG. 1 illustrates an item storage area 120 (e.g., a refrigerator or a pantry, among other alternatives) that includes one or more items. In the example of FIG. 1, the item storage area 120 includes a first item 122 identified as Item (1) and a second item 124 identified as Item (2). It will be appreciated that the item storage area 120 may include alternative numbers of items, with an Nth item 126 identified as Item (N) in FIG. 1. Each item in the item storage area 120 may include a barcode or other visual identifier (e.g., a product logo, etc.) on a product package. For example, as illustrated in FIG. 1, an identifier 128 of the first item 122 may include a scannable barcode. While not illustrated in FIG. 1, an identifier 130 of the second item 124 and an identifier 132 of the Nth item 126 may also include scannable barcodes or other visual identifiers.

The handheld device 102 is configured to communicate identifier information 134 (e.g., barcode information or a product logo image) associated with a particular scanned item (e.g., the first item 122 in FIG. 1) to the one or more remote computing devices 116. Further, the handheld device 102 may be configured to communicate voice data 136 (e.g., an audio recording) associated with the voice input 106 received from the user 104. That is, the voice data 136 may represent an audio recording of the user's speech that may be stored in a memory of the handheld device 102 (see e.g., FIG. 2).

The handheld device 102 may correspond to a wide variety of electronic devices. In some embodiments, the handheld device 102 may be a computing device that includes one or more processors and a memory, which may contain software applications executed by the processors (see e.g., the computing device 600 of FIG. 6). Software of the handheld device 102 may include components for establishing communications over wireless or wired communication networks or directly with other computing devices. Illustratively, the handheld device 102 may be a mobile device, such as a mobile phone, personal digital assistant ("PDA"), mobile gaming device, media player, electronic book reader, tablet computer, laptop computer, or the like. In some cases, the handheld device 102 may include an electronic device that is dedicated to voice-assisted scanning and may, as an example, include a magnet (not shown) to attach the handheld device 102 to a refrigerator for safe-keeping.

The network 118 may be a publicly accessible network of linked networks, possibly operated by various distinct parties, such as the Internet. In other embodiments, the network 118 may include a private network, personal area network ("PAN"), LAN, WAN, cable network, satellite network, etc. or some combination thereof, each with access to and/or from the Internet. For example, the one or more remote computing devices 116 may be located within a single data center, and may communicate via a private network as described above. The handheld device 102 may communicate with the one or more remote computing devices 116 via the Internet. The handheld device 102 may have access to the Internet via a wired or WiFi connection, or via a cellular telephone network (e.g., a Long Term Evolution or LTE network).

The one or more remote computing devices 116 of FIG. 1 include item identification processing capabilities as well as spoken language processing capabilities. Spoken language processing systems generally include various modules and components for receiving speech input from a user, determining what the user said, and determining what the user meant. For example, a natural language processing ("NLP") system may perform speech recognition and generate spoken language processing results, including the likely meaning of user utterances, for use by applications that respond to user utterances. FIG. 1 illustrates a particular example of an NLP system that includes components to perform various automatic speech recognition (ASR) operations and natural language understanding (NLU) operations.

In the embodiment illustrated in FIG. 1, the one or more remote computing devices 116 include an item identification module 138, an automatic speech recognition ("ASR") module 140, a natural language understanding ("NLU") module 142, and an application module 144. The item identification module 138 is configured to identify the scanned item (e.g., the first item 122) based on the identifier information 134 (e.g., barcode information or an image of a product logo) received from the handheld device 102. For example, the item identification module 138 may query an item database (DB) 146 that stores information for a plurality of items, with each item associated with one or more product identifiers.

The voice input 106 can be communicated from the handheld device 102 as voice data 136 to the one or more remote computing devices 116 via the network 118 for transcription by the ASR module 140. The ASR module 140 is configured to receive the voice data 136 and to generate one or more likely transcriptions of the utterance. In some cases, the ASR module 140 may provide a transcription or N-best list of transcriptions to the NLU module 142. The NLU module 142 may identify particular words (e.g., named entities) in the transcription or N-best list of transcriptions that are of particular importance in determining the user's intent.

In some cases, information associated with a scanned item may be used to improve the quality of speech processing by the ASR module 140, the NLU module 142, or both. To illustrate, when the scanned item is identified as milk (see e.g., FIG. 2), words relating to milk may be emphasized when the ASR module 140 generates or ranks likely transcriptions. As illustrative examples, a word such as "percent" may be considered more likely to be related to milk than a word such as "person." Accordingly, the ASR module 140 may emphasize the word "percent" when generating or ranking transcriptions, even though the word "person" may be a more common utterance in a general context. That is, without the additional context provided by the scanned identifier, the ASR module 140 may normally identify the phrase "two persons" as a more likely transcription of a user utterance than the phrase "two percent." Thus, the additional information that is accessible based on the scanned identifier may improve the quality of speech recognition by the ASR module 140. Further, the NLU module 142 may use the additional context provided by the scanned identifier to emphasize particular words (e.g., named entities) in a transcription when determining the user's likely intent. To illustrate, continuing with the milk example, the NLU module 142 may determine that the user's intent when uttering the word "percent" is more likely to refer to the fat content of the milk.

In some cases, information associated with a scanned item may be used to select, modify, or adapt a model that is used for speech recognition or natural language understanding. For example, the information associated with a scanned item may be used to select a language model from a plurality of language models (e.g., to select a language model adapted for milk-related utterances from a plurality of language models relating to food items). In another example, the information associated with a scanned item may be used to modify or adapt a language model (e.g., a general language model may be interpolated with a language model for milk-related utterances to emphasize words relating to milk). Similarly, other models, such as acoustic models for natural language understanding may be selected, modified, or adapted using information about the scanned item.

The NLU module 142 is further configured to receive information associated with the scanned item determined by the item identification module 138. The NLU module 142 is configured to generate a semantic representation of the user utterance 106 based on a combination of the information from the ASR module 140 and the information from the item identification module 138. That is, the NLU module 142 may determine what the user 104 would like to do, also known as the user intent, based not only on recognized speech but also on item information obtained from the item database 146 based on a physical identifier (e.g., a barcode), thereby providing an improved voice-assisted scanning experience. A semantic representation may include one or more user intents and one or more named entities. For example, a user intent may indicate a quantity of an item ("I would like two of these"), a modification of a characteristic of an item ("I would like this but in half gallon size"), or an action to be performed ("Add this to my shopping cart"). A named entity may include, for example, items ("milk" or "Hood half-gallon whole milk"), features of items ("half gallon" or "two percent"), or quantities of items ("two" or "a dozen").

After the NLU module 142 has produced results (e.g., has determined one or more likely interpretations) and, optionally, scores for those results (such as a confidence score representing a probability that the results are valid or accurate), the most likely or appropriate interpretation may be selected. The NLU module 142 may generate an output that may be used by a computer application (e.g., the application module 144) to respond or otherwise perform an action 148 according to the user's intent. To illustrate, in some cases, the voice input 106 may be associated with a quantity of an item to be ordered (see e.g., FIG. 2), and the action 148 may include updating a cart of the user 104 (e.g., stored in a cart database 206). As another illustrative example, the voice input 106 may be associated with a request for additional item information (see e.g., FIGS. 3 and 4), and the action 148 may include obtaining supplemental information (e.g., by querying the item database 146) and providing the supplemental information to the user 104.

Figure 2:
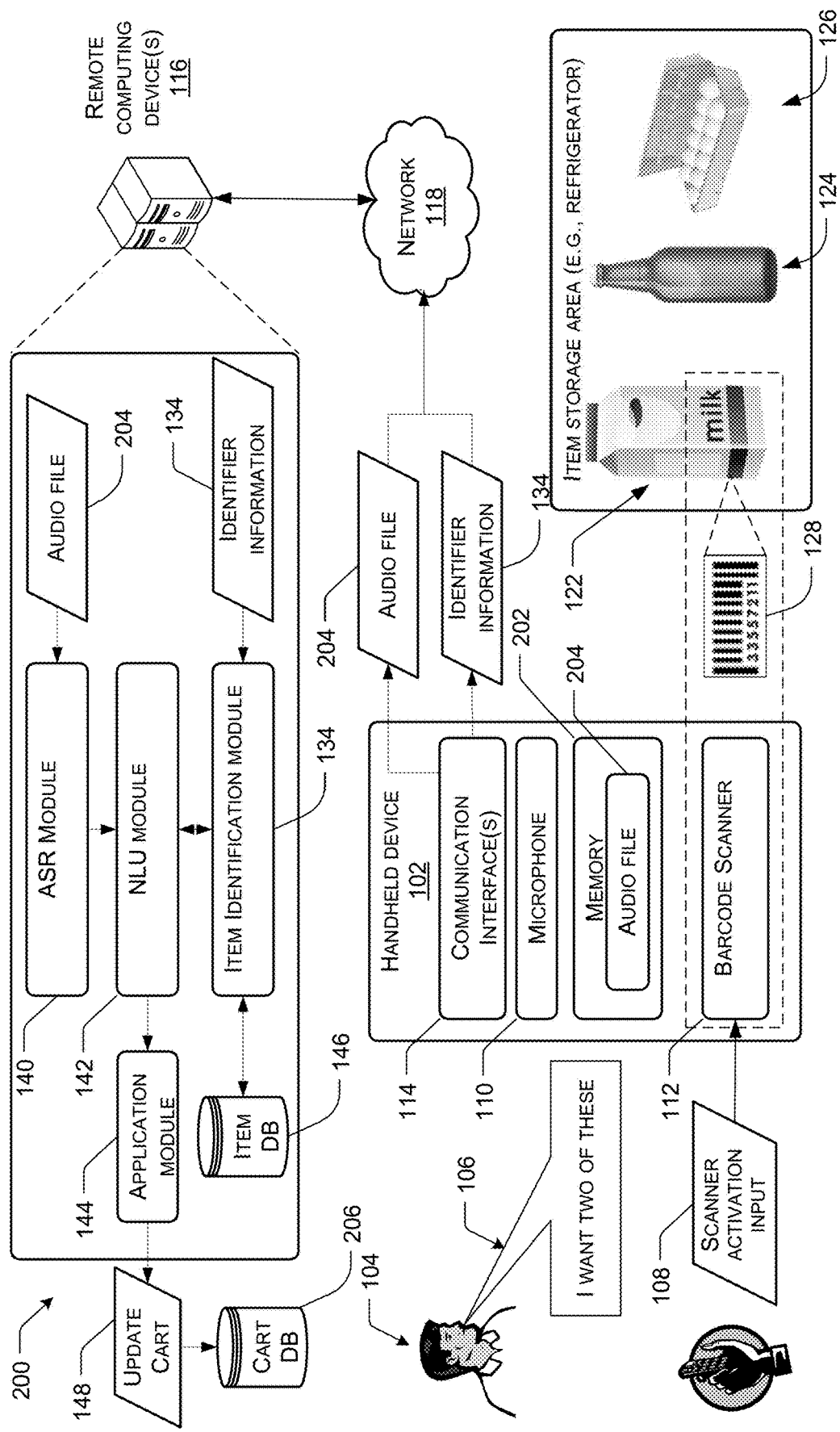
Figure 3:
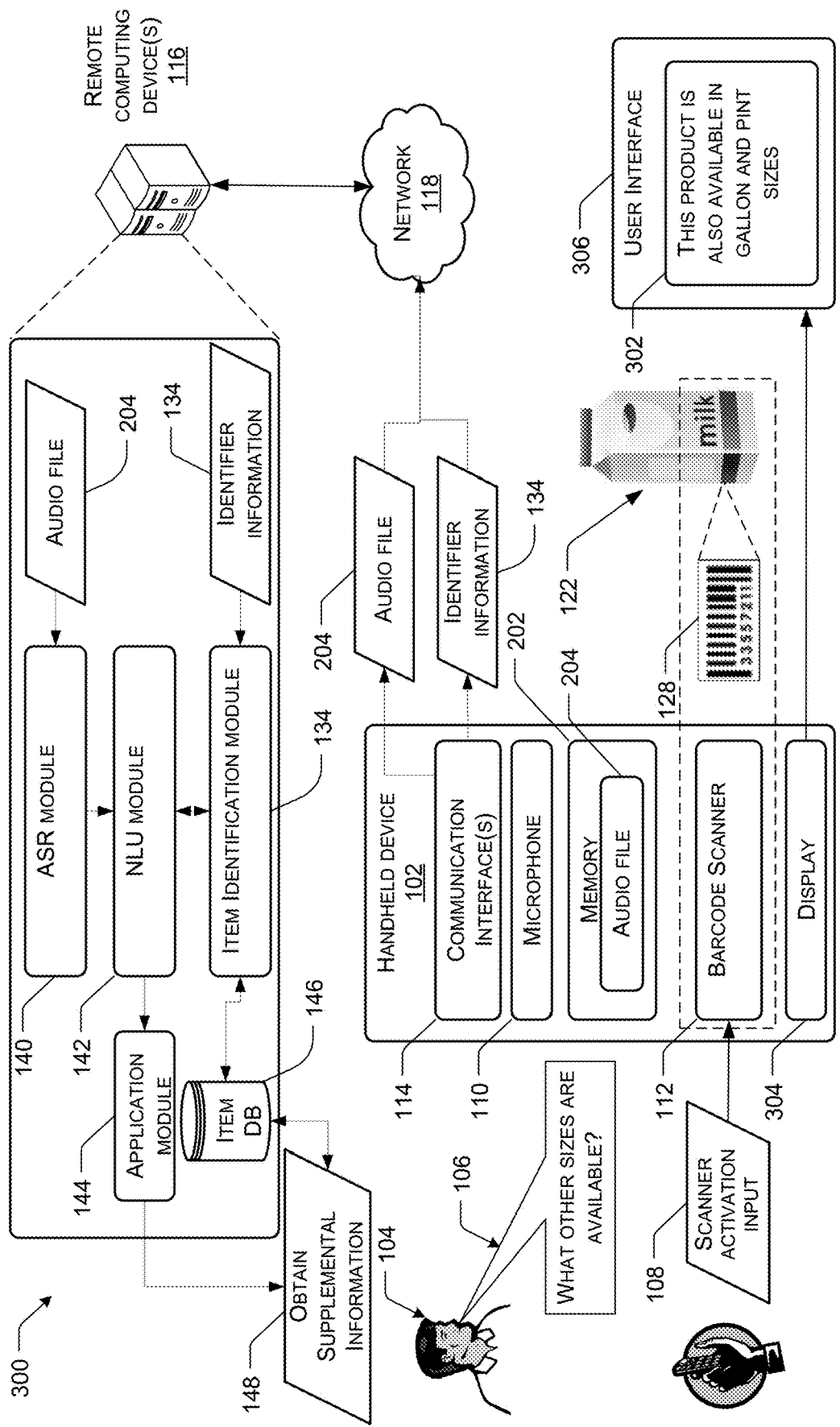
Figure 4:
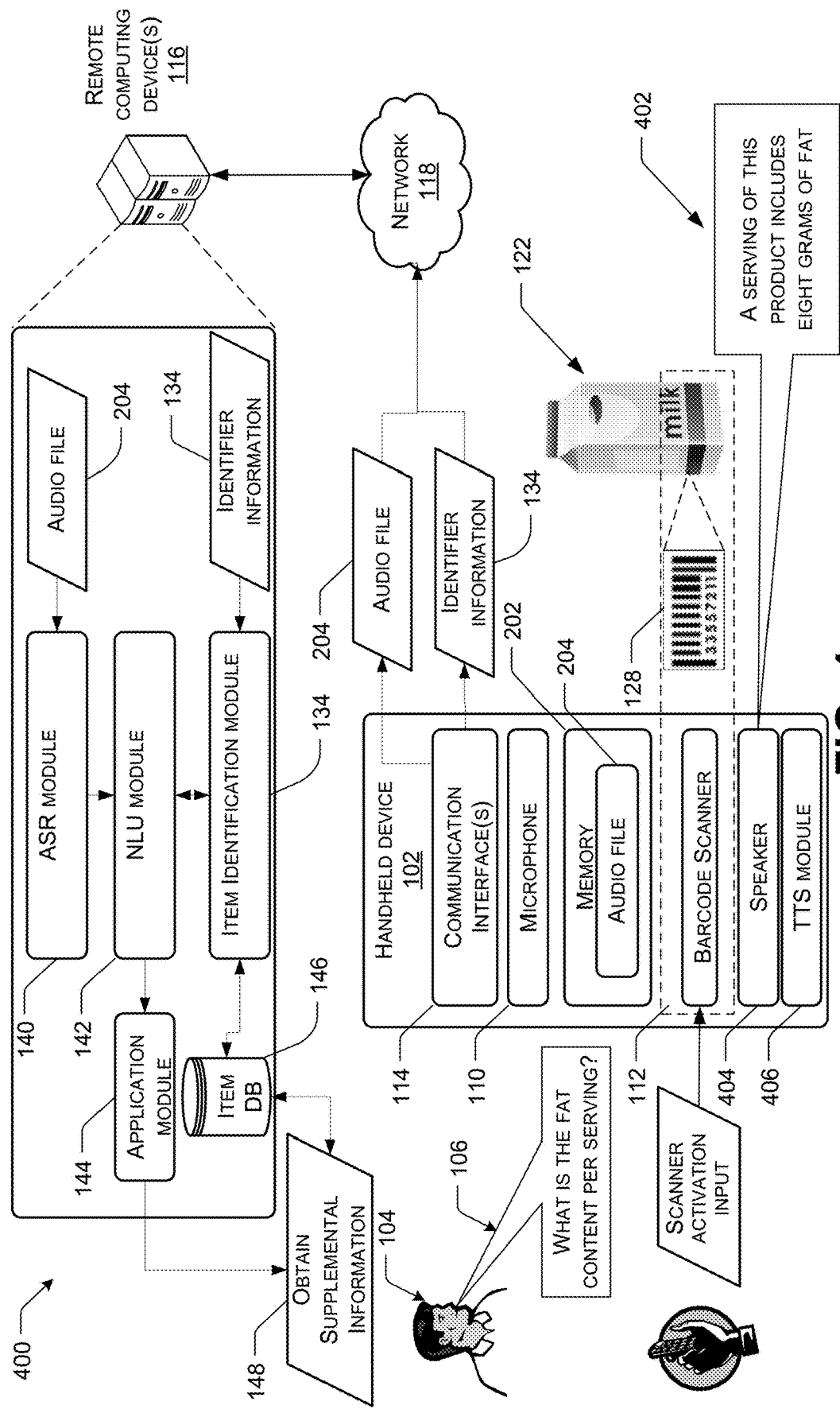

FIG. 2 illustrates an example case in which the NLU module 142 determines that the most likely intent of the user 104 is to specify a quantity (i.e., two) of the first item 122 to be ordered. Based on this identified user intent, the application module 144 may execute a command associated with updating a virtual shopping cart (see e.g., FIG. 5 as an example of a user interface associated with a grocery delivery service) of the user to update a quantity of two of the first item 122. FIGS. 3 and 4 illustrate alternative examples in which the NLU module 142 determines that the user 104 is interested in obtaining additional information related to the first item 122. Based on this identified user intent, the application module 144 may query the item database 146 to identify supplemental information related to the first item 122 and communicate the supplemental information to the handheld device 102 (e.g., to be presented to the user 104 visually as in FIG. 3 or to be presented audibly as in FIG. 4).

In the example of FIG. 1, the components of the NLP system are illustrated as being stored on one or more remote computing devices 116. In some embodiments, the NLP system can include several devices physically or logically grouped together, such as an application server computing device configured to perform speech recognition on an utterance and a database server computing device configured to store records and speech recognition models. In multi-device implementations, the various devices may communicate via an internal communication network, such as a corporate or university network configured as a local area network ("LAN") or a wide area network ("WAN"). In some cases, the devices may communicate over an external network, such as the Internet, or a combination of internal and external networks.

In some embodiments, the features and services provided by the NLP system may be implemented as web services consumable via the network 118. In further embodiments, the features and services may be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Thus, FIG. 1 illustrates that a combination of the voice input 104 received from the user 104 and a scanned identifier of an item (e.g., the barcode 128 of the first item 122) may be used to improve voice recognition accuracy and provide an enhanced user experience. For example, the user 104 may more easily update his shopping cart by audibly specifying a quantity of a particular item and identifying the particular item by scanning. As another example, the user 104 may more easily obtain additional information by audibly requesting certain information with respect to an item that is identified by scanning the item.

Referring to FIG. 2, an example framework for voice-assisted scanning is illustrated and generally designated 200. FIG. 2 illustrates an example in which the voice input 106 from the user 104 is associated with a quantity of an item to be ordered. In the example of FIG. 2, speech recognition is performed on the one or more remote computing devices 116 (e.g., via the ASR module 140). That is, the handheld device 102 may not include speech recognition capabilities but rather may include audio recording capabilities and may transmit the audio via the network 118. As such, the handheld device 102 may include a memory 202 to store an audio file 204 that includes a recording of the voice input 106.

An anaphora is a type of expression whose reference depends upon another referential element. For example, in the sentence "Jack said milk is good for him," the word "him" is an anaphoric expression in that it is coreferential with the expression in the subject position. In some cases, anaphora may present challenges for natural language processing. FIG. 2 illustrates that the voice input 106 may include anaphora (e.g., "these"). In the illustrative, non-limiting example of FIG. 2, the first item 122 includes a half-gallon of a particular brand of milk (e.g., "Chicken Feed Organic Milk"). In some cases, the user 104 may desire to order one or more additional half-gallons of the same type of milk. However, the user 104 may not use language such as "I would like to add two half-gallons of Chicken Feed Organic Milk to my shopping cart" that would more clearly identify the user's intent. Instead, the user 104 may use less formal language such as "I want two of these." FIG. 2 illustrates that when the voice input 106 includes such anaphora, the NLU module 142 may use the information retrieved by the item identification module 138 to determine that the likely intent of the user in speaking the term "these" is to refer to the particular scanned item (i.e., the first item 122).

In the example of FIG. 2, the item identification module 138 may query the item database 146 based on the identifier information 134 in order to retrieve item information for the first item 122. For example, the retrieved item information may include a volume of the first item 122 (i.e., a half-gallon) and a particular type/brand of milk (i.e., "Chicken Feed Organic Milk"). The NLU module 142 may use the item information retrieved by the item identification module 138 to determine that the word "these" in the sentence "I want two of these" refers to the first item 122. That is, the NLU module 142 may replace the word "these" with a reference to the information for the first item 122 to determine that the user intent roughly corresponds to "I want to order two half-gallons of Chicken Feed Organic Milk."

In some cases, the NLU module 142 may determine that a user intent associated with a particular voice input is to identify other item(s) that are not exactly the same as the particular scanned item but that are similar or related. As illustrative examples, the user 104 may specify one or more properties such as weight, size, flavor, or brand, among other alternatives. To illustrate, in the case of a voice input such as "I want two of these but in two percent," the first item 122 may be whole milk, and the NLU module 142 may determine that the user intent roughly corresponds to "I want to order two half-gallons of two percent Chicken Feed Organic Milk." Further, in some cases, differential properties may be relative (e.g., cheaper, smaller, larger, long, heavier, or spicier, among other alternatives). To illustrate, in the case of a voice input such as "I want two of these but in a larger size," the first item 122 may be a half-gallon size, and the NLU module 142 may determine that the user intent roughly corresponds to "I want to order two gallons of Chicken Feed Organic Milk." Alternative examples may include removing an item from a virtual cart (e.g., in response to voice input such as "Don't buy this" or "Remove this"), setting a frequency of delivery (e.g., in response to voice input such as "Deliver this every week"), or specifying that an item should not be ordered again (e.g., in response to voice input such as "Don't buy this brand again"), among other alternatives.

In some examples, the voice input 106 may be recorded by the handheld device 102 and stored in the memory 202 as the audio file 204. In some cases, the user 104 may speak the voice input 106 prior to scanning the barcode 128 of the first item 122 (i.e., speaking "I want two of these" and then scanning the barcode 128). Alternatively, the user 104 may speak the voice input 106 after scanning the barcode 128 of the first item 122 (i.e., scanning the barcode 128 and then speaking "I want two of these"). As another example, at least a portion of the voice input 106 may be provided while the user 104 scans the barcode 128 of the first item 122. To illustrate, the user 104 may begin speaking "I want two of these" and scan the barcode 128 before completing the speech. As such, the scanned barcode 128 and a temporal identification of when the barcode 128 was scanned with respect to the timing of the voice input 106 may also be stored in the memory 202.

In some cases, the voice input 106 from the user 104 may refer to an item that was scanned prior to the voice input 106 or may refer to an item that is to be scanned after the voice input 106. In some cases, words such as "that" or "those" may imply that the item(s) were scanned prior to the voice input 106, while words such as "this" or "these" may imply that the item(s) are to be scanned after the voice input 106. Accordingly, the NLU module 142 may use such implied information as an input when determining the most likely user intent.

In some cases, the user 104 may desire to provide a shorthand identifier of an item to be stored for future reference. To illustrate, referring to the example of FIG. 2, the second item 124 in the refrigerator may include a particular brand and type of beer (e.g., "Spokane's Worst") with its own scannable barcode identifier 130. The user 104 may speak "This is my favorite beer" before, during, or after using the scanner 112 to identify the second item 124. This speech along with information associated with the scanned barcode identifier 130 may be provided to the one or more remote computing devices 116 and may be stored (e.g., in the item database 146 or the cart database 206, among other alternatives) for future reference. When the user 104 desires to re-order the same type of beer in the future, the user 104 may speak "Order a six-pack of my favorite beer" or something similar that may be received via the microphone 110 of the handheld device 102. In this case, the user may not scan the barcode 130 of the second item 124. Instead, the NLU module 142 may be able to automatically determine that the likely user intent is to add a six-pack of Spokane's Worst beer to his shopping cart, even though no information has been obtained via the scanner 112 of the handheld device 102 and provided along with the audio file 204. Thus, the present disclosure may provide an enhanced user experience by allowing the user 104 to re-order items via shorthand audible references to particular products.

As another example, the user 104 may wish to provide feedback with respect to a particular item. To illustrate, the third item 126 in the refrigerator 120 may include a particular brand or type of eggs (e.g., "Chicken Littles"). The user 104 may desire to provide a favorable or unfavorable rating for use by other consumers when making decisions regarding which type of eggs to order. To illustrate, the user 104 may speak "I don't like these eggs" before, during, or after using the scanner 112 to identify the third item 126. This speech along with information associated with a scanned identifier 132 may be provided to the one or more remote computing devices 116 and may be stored (e.g., in the item database 146 or the cart database 206, among other alternatives).

Referring to FIG. 3, an example framework for voice-assisted scanning is illustrated and generally designated 300. FIG. 3 illustrates an example in which the voice input 106 is associated with a request for supplemental information 302 for a scanned item (e.g., the first item 122). FIG. 3 further illustrates that the handheld device 102 may include a display 304 to present the supplemental information 302 via a user interface 306.

In the example of FIG. 3, the first item 122 includes a half-gallon of milk. In some cases, the user 104 may desire to order the same type of milk in a different size. As an illustrative, non-limiting example, the user 104 may speak the voice input 106 "What other sizes are available?" which may be recorded by the handheld device 102 and stored in the memory 202 as the audio file 204. As explained above, in some cases, the user 104 may speak the voice input 106 prior to scanning the barcode 128, after scanning the barcode 128, or may speak at least a portion of the voice input 106 while scanning the barcode 128.

In the example of FIG. 3, the item identification module 138 may query the item database 146 based on the identifier information 134 in order to retrieve item information for the first item 122. The NLU module 142 may use the item information retrieved by the item identification module 138 to determine that the likely intent of the user 104 is to identify sizes of the particular brand of milk other than the half-gallon size. That is, the NLU module 142 may determine that the user intent associated with the voice input 106 "What other sizes are available?" may roughly correspond to "What volumes is Chicken Feed Organic Milk available in, excluding the half-gallon volume?" and may direct the application module 144 to determine this information (e.g., by querying the item database 146). In the example of FIG. 3, the application module 144 may determine that the other available volumes include a gallon size and a pint size. The application module 144 may communicate the supplemental information 302 to the handheld device 102 (e.g., via the network 118). The handheld device 102 may display the supplemental information 302 via the user interface 306.

Referring to FIG. 4, an example framework for voice-assisted scanning is illustrated and generally designated 400. FIG. 4 illustrates an example in which the voice input 106 is associated with a request for supplemental information 402 for a scanned item (e.g., the first item 122). FIG. 4 further illustrates that the handheld device 102 may include a speaker 404 to provide the supplemental information 402 to the user 104 in an audible format.

In the example of FIG. 4, the first item 122 includes a half-gallon of milk. In some cases, the user 104 may desire to determine additional product information related to the first item 122 (e.g., nutrition information or allergy information, among other alternatives). As an illustrative, non-limiting example, the user 104 may speak the voice input 106 "What is the fat content per serving?" which may be recorded by the handheld device 102 and stored in the memory 202 as the audio file 204. As explained above, in some cases, the user 104 may speak the voice input 106 prior to scanning the barcode 128, after scanning the barcode 128, or may speak at least a portion of the voice input 106 while scanning the barcode 128.

Based on the identifier information 134 and the item database 146, the item identification module 138 may identify the first item 122 as a particular brand of milk. The NLU module 142 may determine that the intent of the user 104 is to identify nutrition information related to the particular brand of milk. That is, the NLU module 142 may determine that the user intent associated with the voice input 106 "What is the fat content per serving?" may roughly correspond to "What is the fat content per serving of Chicken Feed Organic Milk?" and may direct the application module 144 to determine this information (e.g., by querying the item database 146). In the example of FIG. 4, the application module 144 may determine that a serving of the particular brand of milk includes eight grams of fat per serving. The application module 144 may communicate the supplemental information 402 to the handheld device 102 (e.g., via the network 118) to be presented to the user 104 in an audible format via the speaker 404.

In some cases, the supplemental information 402 may be provided to the handheld device 102 as audio information. Alternatively, the supplemental information 402 may be provided as text, and the handheld device 102 may optionally include a text to speech (TTS) module 408 to convert the supplemental information 402 into speech for audible presentation to the user 104.

Figure 5:
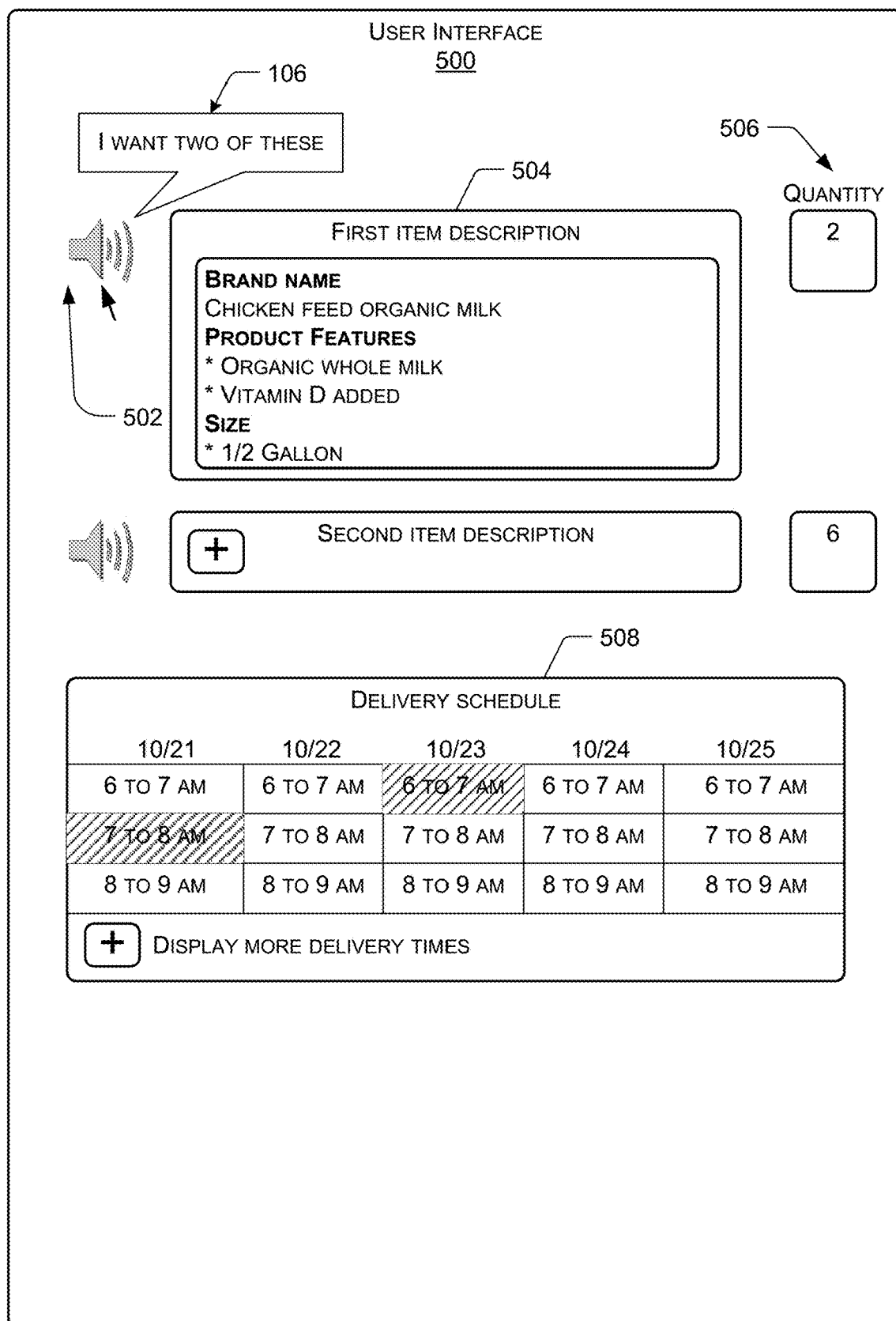
FIG. 5 illustrates an example of a user interface that allows a user to review audio recordings associated with voice-assisted scanning operations, according to some implementations.

Referring to FIG. 5, an example user interface associated with a voice-assisted scanning system is illustrated and generally designated 500. FIG. 5 illustrates that the user 104 may review an audio recording of a voice input prior to confirming an order in order to verify that the user intent was accurately captured and to resolve any inconsistencies.

In some cases, the handheld device 102 may include a display (see e.g., FIG. 3), and the user interface 500 may be presented on the handheld device 102. Alternatively, the user interface 500 may be presented on another electronic device (e.g., a laptop computer, a desktop computer, a phone, or a tablet computer, among other alternatives).

In FIG. 5, a selectable icon 502 may be associated with each audio recording received from the user 104. To illustrate, the voice input 106 received from the user 104 may correspond to "I want two of these" (see e.g., FIG. 2). The user 104 may select the selectable icon 502 to review the audio recording, an item description 504, and a quantity 506. Thus, the user 104 may verify that the voice-assisted scanning system correctly identified the user intent (e.g., an intent to order two half-gallon sized containers of "Chicken Feed Organic Milk"). FIG. 5 further illustrates a particular example in which the user 104 may identify or confirm a delivery schedule 508 for the identified items.

Example Electronic Devices

Figure 6:
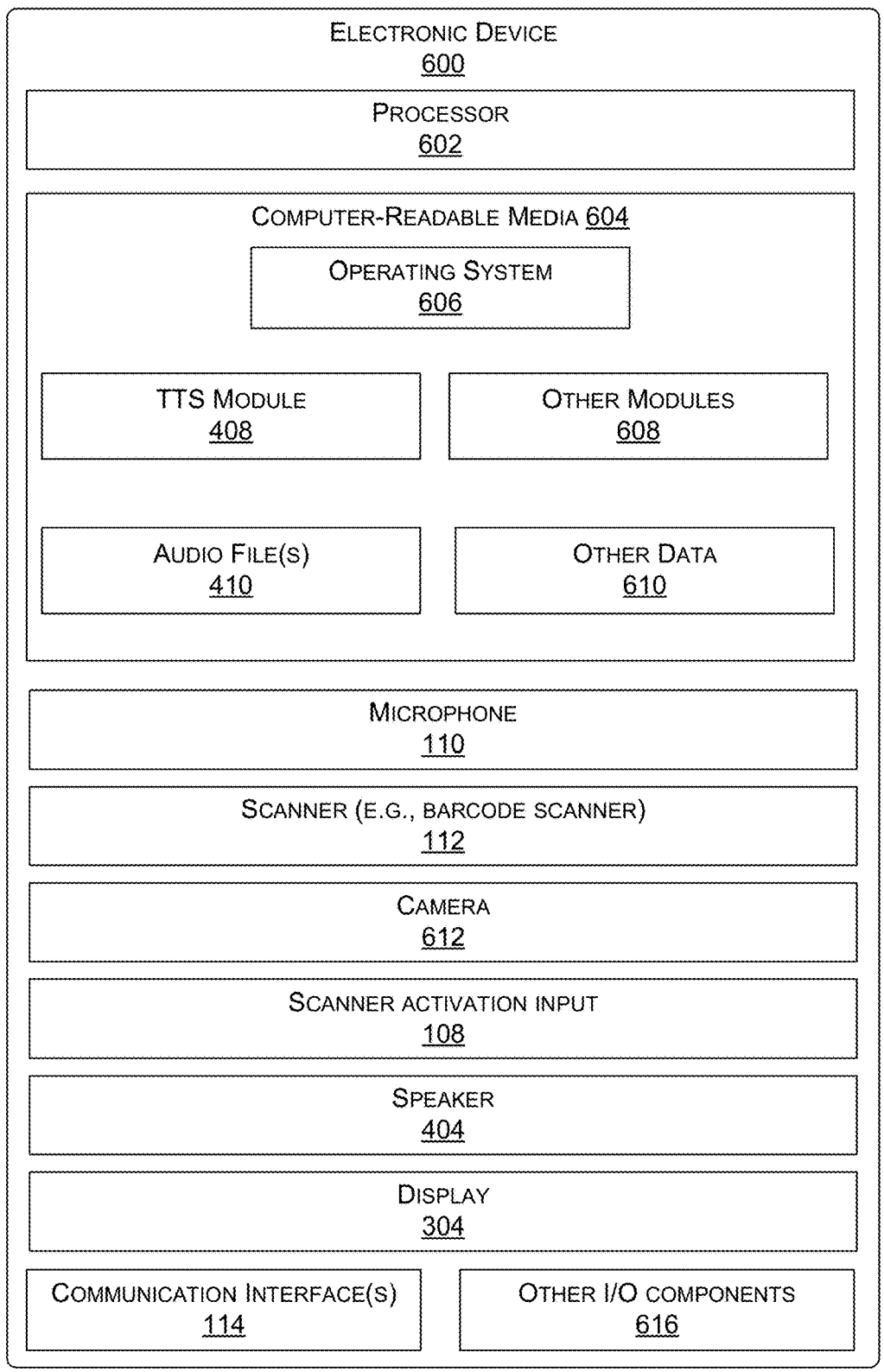
FIG. 6 illustrates select components of an example handheld device for use in voice-assisted scanning, according to some implementations.

FIG. 6 illustrates select example components of an electronic device 600 that may be used to implement the functionality described above according to some implementations. The electronic device 600 illustrated in FIG. 6 may correspond to the handheld electronic device 102 of FIGS. 1-4. In a very basic configuration, the electronic device 600 includes, or accesses, components such as at least one processor 602 and a computer-readable media 604. Each processor 602 may itself comprise one or more processors or cores. The processor(s) 602 can be configured to fetch and execute computer-readable instructions stored in the computer-readable media 604 or other computer-readable media.

Depending on the configuration of the electronic device 600, the computer-readable media 604 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 602 directly or through another computing device. Accordingly, the computer-readable media 604 may be computer-readable media able to maintain instructions, modules or components executable by the processor 602.

The computer-readable media 604 may be used to store any number of functional components that are executable by the processor 602. In some implementations, these functional components comprise instructions or programs that are executable by the processor 602 and that, when executed, implement operational logic for performing the actions attributed above to the electronic device 600. Functional components of the electronic device 600 stored in the computer-readable media 604 may include the TTS module 408 (see FIG. 4), as described above, which may be executed on the processor 602. Other functional components may include an operating system 606 for controlling and managing various functions of the electronic device 600. Depending on the type of the electronic device 600, the computer-readable media 604 may also optionally include other functional components, such as other modules 608, which may include applications, programs, drivers and so forth.

The computer-readable media 604 may also store data, data structures, and the like that are used by the functional components. For example, data stored by the computer-readable media 604 may include one or more audio files 410 (see FIG. 4) that may represent recordings of the voice input 106 received from the user 104. The electronic device 600 may also include other data 610, which may include, for example, data used by the operating system 606 and the other modules 608. Further, the electronic device 600 may include many other logical, programmatic and physical components, of which those described are merely examples that are related to the discussion herein.

FIG. 6 further illustrates an embodiment in which the electronic device includes the display 304 (see FIG. 3), which may be passive, emissive or any other form of display. In one implementation, the display 412 may be an active display such as a liquid crystal display, plasma display, light emitting diode display, organic light emitting diode display, and so forth.

One or more communication interfaces 114 may support both wired and wireless connection to various networks, such as cellular networks, radio, WiFi networks, short-range or near-field networks (e.g., Bluetooth®), infrared signals, local area networks, wide area networks, the Internet, and so forth. The communication interface 114 may further allow a user to access storage on another device, such as a user's computing device, a network attached storage device, or the like.

The electronic device 600 may further be equipped with various other input/output (I/O) components 616. Such I/O components may include a touchscreen and various user actuatable controls (e.g., buttons, a joystick, a keyboard, a mouse, etc.), speakers 404 (see FIG. 4), a microphone 110, a camera 612, connection ports, and so forth. For example, the operating system 606 of the electronic device 600 may include suitable drivers configured to accept input from a keypad, keyboard, or other user actuatable controls and devices included as the I/O components 616. For instance, the user actuatable controls may include a scanner activation input 108, page turning buttons, navigational keys, a power on/off button, selection keys, and so on. Additionally, the electronic device 600 may include various other components that are not shown, examples of which include removable storage, a power source, such as a battery and power control unit, a global positioning system (GPS) device, a PC Card component, and so forth.

Figure 7:
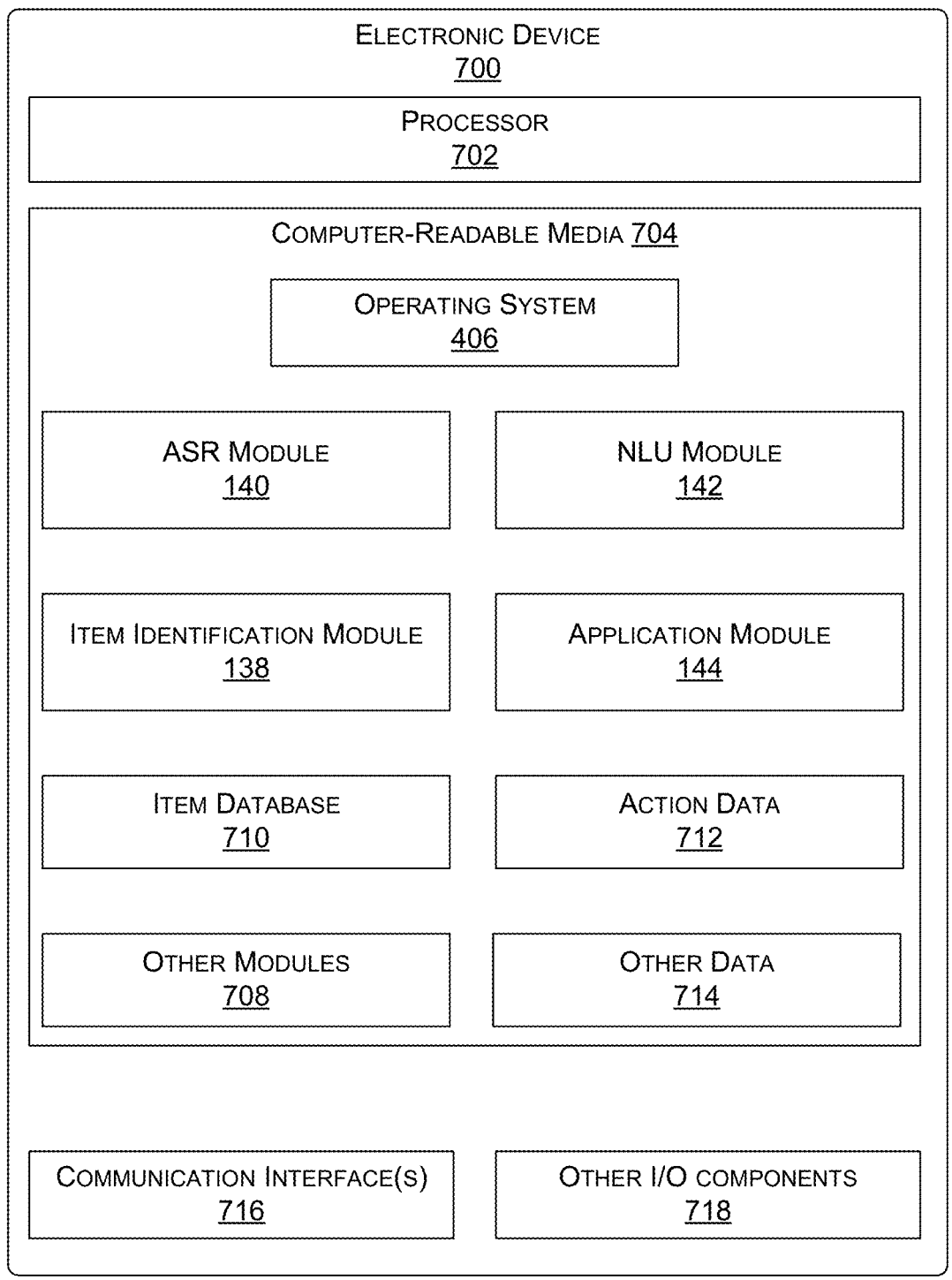
FIG. 7 illustrates select components of an example electronic device for performing voice-assisted scanning operations based on a combination of voice input and a scanned physical identifier received from a handheld device, according to some implementations.

FIG. 7 illustrates select example components of an electronic device 700 that may be used to implement the functionality described above according to some implementations. The electronic device 700 illustrated in FIG. 7 may correspond to the one or more remote computing devices 116 of FIGS. 1-4. In a very basic configuration, the electronic device 700 includes, or accesses, components such as at least one processor 702 and a computer-readable media 704. Each processor 702 may itself comprise one or more processors or cores. The processor(s) 702 can be configured to fetch and execute computer-readable instructions stored in the computer-readable media 704 or other computer-readable media.

Depending on the configuration of the electronic device 700, the computer-readable media 704 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 702 directly or through another computing device. Accordingly, the computer-readable media 704 may be computer-readable media able to maintain instructions, modules or components executable by the processor 702.

The computer-readable media 704 may be used to store any number of functional components that are executable by the processor 702. In some implementations, these functional components comprise instructions or programs that are executable by the processor 702 and that, when executed, implement operational logic for performing the actions attributed above to the electronic device 700. Functional components of the electronic device 700 stored in the computer-readable media 704 may include the item identification module 138, the ASR module 140, the NLU module 142, and the application module 144, as described above, which may be executed on the processor 702. Other functional components may include an operating system 706 for controlling and managing various functions of the electronic device 700. Depending on the type of the electronic device 700, the computer-readable media 704 may also optionally include other functional components, such as other modules 708, which may include applications, programs, drivers and so forth.

The computer-readable media 704 may also store data, data structures, and the like that are used by the functional components. For example, data stored by the computer-readable media 704 may include item data 710 accessible to the item identification module 138 and action data 712 accessible to the application module 144. The electronic device 700 may also include other data 714, which may include, for example, data used by the operating system 706 and the other modules 708. Further, the electronic device 700 may include many other logical, programmatic and physical components, of which those described are merely examples that are related to the discussion herein.

One or more communication interfaces 716 may support both wired and wireless connection to various networks, such as cellular networks, radio, WiFi networks, short-range or near-field networks (e.g., Bluetooth®), infrared signals, local area networks, wide area networks, the Internet, and so forth. The electronic device 700 may further be equipped with various other input/output (I/O) components 718. Additionally, the electronic device 700 may include various other components that are not shown.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Process

Figure 9:
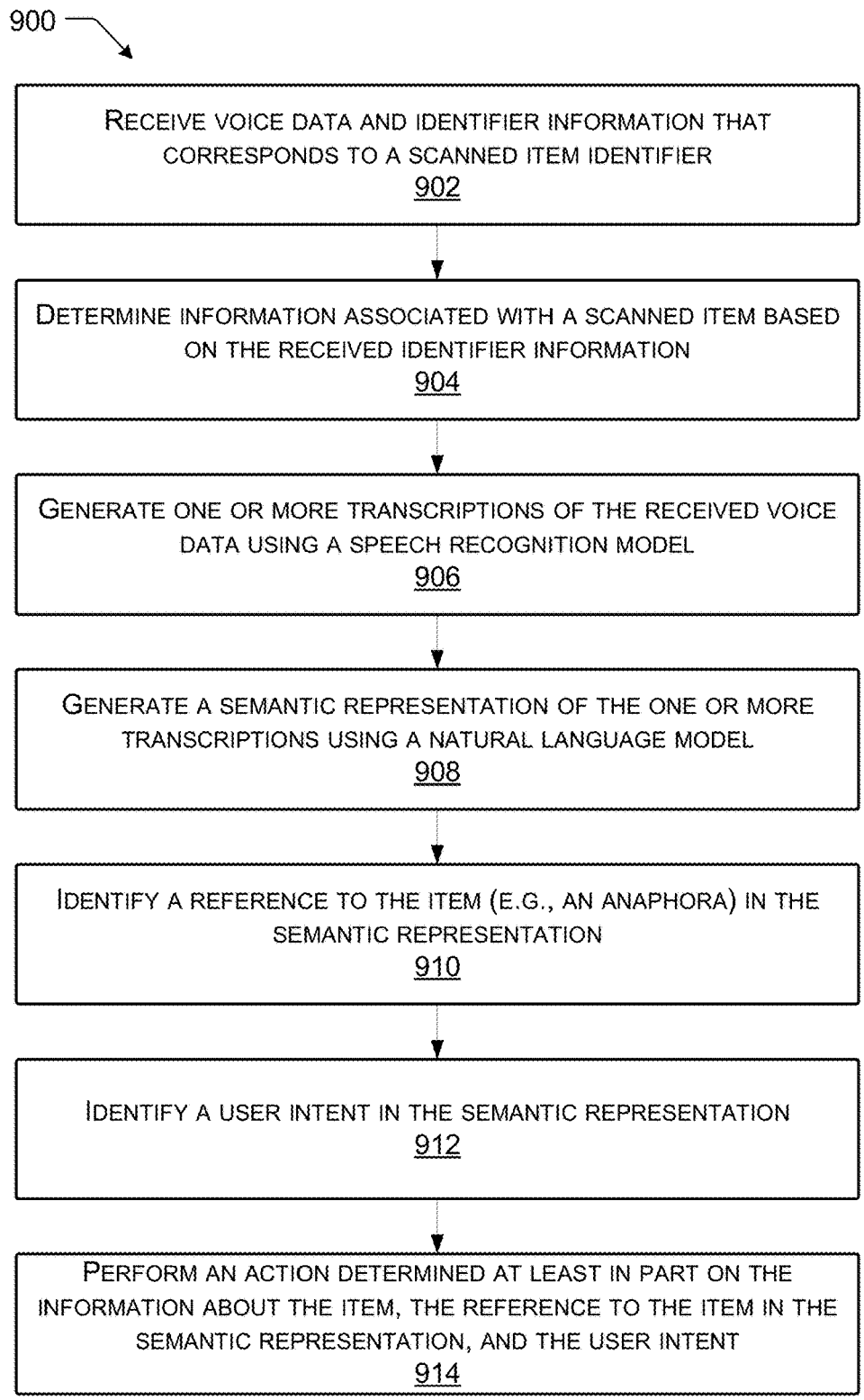
FIG. 9 illustrates example process for voice-assisted scanning that combines voice data and scanned identifier information, according to some implementations.

FIGS. 8 and 9 illustrate example processes 800 and 900 for voice-assisted scanning, as described above. FIGS. 8 and 9 illustrate the processes 800 and 900 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

FIG. 8 illustrates an example process 800 for using a handheld device to combine a voice input with a scanned identifier (e.g., a barcode) for voice-assisted scanning, according to some implementations.

At 802, the process 800 includes receiving, at a handheld device that includes a microphone and a scanner, a voice input from a user. As an illustrative example, referring to FIGS. 1-4, the handheld device 102 may receive the voice input 106 from the user 106 via the microphone 110 (or other alternative audio input component). Further, the example handheld device 102 in FIGS. 1-4 includes the scanner 112, which may be a barcode scanner or other optical component such as a camera configured to scan an item identifier (e.g., a barcode on a product package).

At 804, the process 800 includes receiving a scanner activation input from the user to scan an identifier (e.g., a barcode) of an item. To illustrate, the user 104 may activate the scanner 112 using the scanner activation component 108. In some cases, the scanner activation input 108 may include actuation of a physical button, trigger, or switch on the handheld device 102 (not shown in FIG. 1). As explained above, in some cases, the user 104 may speak the voice input 106 prior to scanning the barcode 128, after scanning the barcode 128, or may speak at least a portion of the voice input 106 while scanning the barcode 128. Thus, while FIG. 8 illustrates receiving the voice input at 804 and receiving the scanner activation input at 806, it will be appreciated that this is merely an illustrative, non-limiting example of one possible sequence of receiving the voice input and the scanner activation input.

At 806, the process 800 includes communicating voice data associated with the voice input and identifier information associated with the scanned identifier to a remote system for voice-assisted scanning. To illustrate, in FIG. 1, the handheld device 102 may communicate the voice data 136 (e.g., as an audio recording of the voice input 106) to the one or more remote computing devices 116 via the network 118. Further, the handheld device 102 may communicate information associated with the scanned barcode 128 as the identifier information 134 (e.g., as a text file that may identify a universal product code (UPC) of the scanned first item 122) to the one or more remote computing devices 116 via the network 118.

Thus, FIG. 8 illustrates that the handheld device 102 may allow a user to both scan an item to uniquely identify the item and provide voice input with respect to the scanned item for voice-assisted scanning.

FIG. 9 illustrates an example process 900 for voice-assisted scanning based on a combination of a voice input and a scanned identifier (e.g., a barcode) received from a handheld device, according to some implementations.

At 902, the process 900 includes receiving voice data and identifier information that corresponds to a scanned item identifier. As an illustrative example, referring to FIG. 1, voice data 136 and the identifier information 134 may be communicated from the handheld device 102 to the one or more remote computing devices 116 via the network 118. In some implementations, as illustrated in FIGS. 2-4, the voice data 136 may be the audio file 204 that represents an audio recording of the voice input 106 from the user 104 that is stored in the memory 202 of the handheld device 102. Further, in some implementations, the identifier information 134 may include information associated with a barcode on a product package that is obtained by scanning the barcode. For example, the scanner 112 of the handheld device 102 may include a barcode scanner, a camera or other optical component to scan the identifier 128 of the first item 122 in the item storage area 120. Thus, in the case of a barcode scanner, the identifier information 134 may include information obtained by scanning the barcode 128. In the case of a camera or other optical component, the information obtained by scanning may include barcode information or other visual information (e.g., a product logo) on a product package of the first item 122.

At 904, the process 900 includes identifying the scanned item based on the received identifier information. To illustrate, the item identification module 138 of FIGS. 1-4 may identify the scanned item as the first item 122 by querying the item database 146 that stores information for a plurality of items, with each item associated with one or more product identifiers.

At 906, the process 900 includes generating one or more transcriptions of the received voice data using a speech recognition model. The model may be selected, adapted, or modified using the received identifier information. To illustrate, the ASR module 140 of FIGS. 1-4 may receive the voice data 136 from the handheld device 102 and generate a transcription or an N-best list of transcriptions to be provided to the NLU module 142.

At 908, the process 900 includes generating a semantic representation of the one or more transcriptions using a natural language understanding model. The model may be selected, adapted, or modified using the received identifier information. To illustrate, the NLU module 142 of FIGS. 1-4 may generate a semantic representation of the one or more transcriptions from the ASR module 140. At 910, the process 900 includes identifying a reference to the item (e.g., an anaphora) in the semantic representation. At 912, the process 900 includes identifying a user intent in the semantic representation. That is, the NLU module 142 may determine what the user 104 would like to do, also known as the user intent, based not only on recognized speech but also on item information obtained from the item database 146 based on a scanned physical identifier (e.g., a barcode), thereby providing an improved voice-assisted scanning experience.

At 914, the process 900 includes performing an action that is determined based at least in part on the information about the item, the reference to the item in the semantic representation, and the user intent in the semantic representation. To illustrate, the NLU module 142 of FIGS. 1-4 may generate an output that may be used by the application module 144 to respond or otherwise perform the action 148 according to the user's intent. To illustrate, in some cases, the voice input 106 may be associated with a quantity of an item to be ordered (see e.g., FIG. 2), and the action 148 may include updating a cart of the user 104 (e.g., stored in a cart database 206). As another illustrative example, the voice input 106 may be associated with a request for additional item information (see e.g., FIGS. 3 and 4), and the action 148 may include obtaining supplemental information (e.g., by querying the item database 146) and providing the supplemental information to the user 104.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
memory;
one or more processors; and
one or more computer-executable instructions that are stored in the memory and that are executable by the one or more processors to perform operations comprising:
receiving first voice data and an item identifier of a first item;
determining, based at least in part on the item identifier, information about the first item;
determining, using at least one of a speech recognition model or a natural language understanding model, one or more first words associated with the first voice data;
determining, using the at least one of the speech recognition model or the natural language understanding model, one or more second words associated with the first voice data or second voice data;
determining, based at least in part on the one or more second words, a second item related to the first item; and
causing, based at least in part on the one or more words or the information about the first item, an action to be performed, wherein the action corresponds to the second item.

2. The system as recited in claim 1, wherein causing the action to be performed includes at least one of adding the second item to a virtual shopping cart or list associated with a user or initiating a purchase of the second item for the user.

3. The system as recited in claim 1, wherein the operations further comprise confirming the action via at least one of a display or one or more speakers of a voice-controlled device associated with a user.

4. The system as recited in claim 1, wherein the first voice data includes a predefined word that causes activation of a voice-controlled device associated with a user and a request to at least one of purchase the first item, add the first item to a list associated with the user, or receive additional information associated with the first item.

5. The system as recited in claim 1, wherein the operations further comprise:
determining the one or more first words using the speech recognition model;

determining, based at least in part on the one or more first words and using the natural language understanding model, a user intent associated with the one or more first words; and
causing, based at least in part on the user intent, the action to be performed.

6. The system as recited in claim 1, wherein the first voice data is received via one or more speakers of a voice-controlled device associated with a user, and wherein confirmation of the action is presented via at least one of one or more displays or one or more speakers of the voice-controlled device.

7. A method comprising:
receiving first voice data and an item identifier of a first item;
determining, based at least in part on the item identifier, information about the first item;
determining, using at least one of a speech recognition model or a natural language understanding model, one or more first words associated with the first voice data;
determining, using the at least one of the speech recognition model or the natural language understanding model, one or more second words associated with the first voice data or second voice data;
identifying, based at least in part on the one or more second words, a second item related to the first item; and
causing, based at least in part on the one or more second words or the information about the first item, an action to be performed, wherein the action corresponds to the second item.

8. The method as recited in claim 7, wherein the action includes at least one of:
adding a particular quantity of the second item to a virtual shopping cart associated with a user;
removing the second item from the virtual shopping cart;
determining first product information associated with the first item; or
determining second product information associated with the second item based at least in part on one or more first properties of the first item and one or more second properties of the second item.

9. The method as recited in claim 7, wherein:
the first voice data includes a predefined word that causes activation of the device and a request to at least one of purchase the first item or add the first item to a list associated with a user; and
confirmation of the action is presented via at least one of one or more displays or one or more speakers of the device.

10. The method as recited in claim 7, further comprising:
generating a semantic representation of the second voice data using at least one of the speech recognition model or the natural language understanding model;
identifying a reference to the second item in the semantic representation;
identifying a user intent in the semantic representation; and
causing the action to be performed based at least in part on the user intent.

11. A method comprising:
receiving, from a device, first voice data associated with a user;
determining, based at least in part on an item identifier of a first item, information about the first item;

determining, using at least one of speech recognition or natural language understanding, one or more first words associated with the first voice data;

determining, using the at least one of the speech recognition or the natural language understanding, one or more second words associated with the first voice data or second voice data associated with the user;

identifying, based at least in part on the one or more second words, a second item related to the first item; and causing, based at least in part on the one or more second words or the information about the first item, an action to be performed, wherein the action corresponds to the second item.

12. The method as recited in claim 11, wherein causing the action to be performed includes at least one of adding the second item to a virtual shopping cart or list associated with the user or initiating a purchase of the second item for the user.

13. The method as recited in claim 11, further comprising:

determining the one or more first words using the speech recognition model;

determining, based at least in part on the one or more first words and using the natural language understanding model, a user intent associated with the one or more first words; and causing, based at least in part on the user intent, the action to be performed.

14. The method as recited in claim 13, wherein the user intent includes at least one of a first indication of a quantity of the first item, a modification of a characteristic of the first item, a request for the information about the first item, or a second indication to add the first item to a virtual shopping cart associated with the user.

15. The method as recited in claim 11, further comprising:

generating a semantic representation of the second voice data;

identifying a reference to the second item in the semantic representation;

identifying a user intent in the semantic representation; and causing the action to be performed based at least in part on the user intent.

16. The method as recited in claim 11, wherein the first voice data includes a predefined word that causes activation of the device and a request to at least one of purchase the first item or to add the first item to a virtual shopping cart associated with the user.

17. The method as recited in claim 11, wherein the action includes a purchase of the second item or an addition of the second item to a list associated with the user, and further comprising confirming the action via at least one of one or more displays of the device or one or more speakers of the device.

18. The method as recited in claim 11, wherein the action includes at least one of:

adding a particular quantity of the second item to a virtual shopping cart associated with the user;

removing the second item from the virtual shopping cart; or determining product information associated with the second item.

19. The method as recited in claim 11, further comprising determining that the first item is related to the second item based at least in part on comparing one or more first properties of the first item and one or more second properties of the second item.

20. The method as recited in claim 11, further comprising determining the item identifier based at least in part on a barcode associated with a product package of the first item, a quick response (QR) code associated with the product package, a radio-frequency identification (RFID) associated with the product package, a near-field communication (NFC) identifier associated with the product package, a product logo associated with the first item, or an image that visually depicts the first item, and wherein determining the information about the first item includes querying an item database that stores item information associated with items included within a catalog of items.

* * * * *